UNITED STATES PATENT OFFICE.

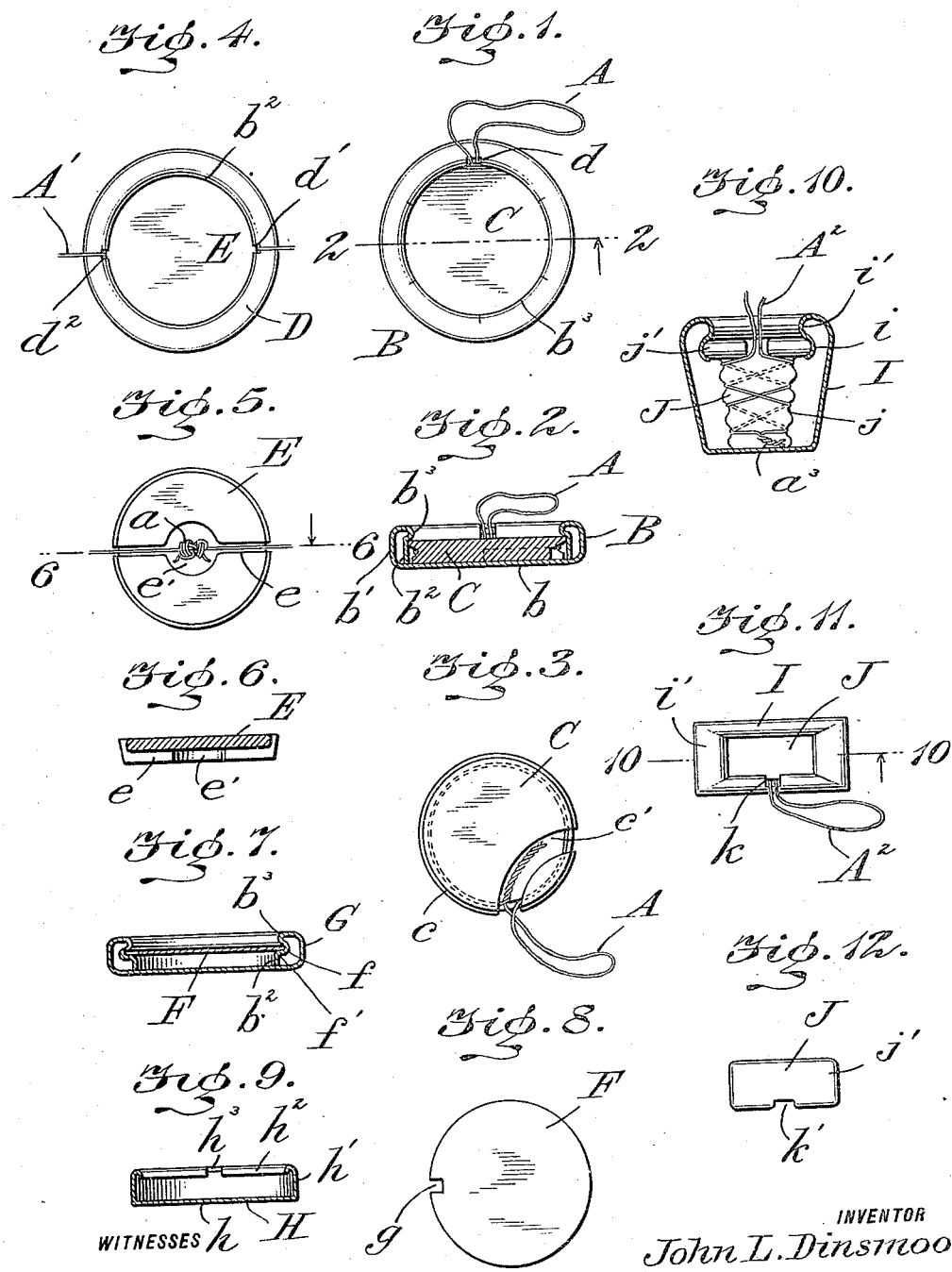

JOHN L. DINSMOOR, OF NEW YORK, N. Y., ASSIGNOR OF ONE-HALF TO HERMANN M. HIRSCHBERG, OF NEW YORK, N. Y.

SEAL.

1,122,871.     Specification of Letters Patent.     Patented Dec. 29, 1914.

Application filed October 15, 1908. Serial No. 457,805.

*To all whom it may concern:*

Be it known that I, JOHN L. DINSMOOR, a citizen of the United States, residing in the city of New York, borough of Brooklyn, county of Kings, and State of New York, have invented a certain new and useful Seal, of which the following is a specification.

This invention is a seal which may be used for a variety of purposes, such as for sealing electric meters, arc lamps, electrical apparatus generally, as well as for doors, covers, closures and other parts of various structures or apparatus.

The seals of the prior art are, generally speaking, adapted for use once only, for the reason that when applied to an apparatus or structure, the seal body or the shackle must be broken, cut or disrupted in such manner that the seal as an entirety cannot be used again. This requires the whole seal to be thrown away, and, of course, such operations involve considerable loss and additional outlay for new seals, particularly in instances where large numbers are used.

According to the present invention, the seal when applied affords ample security against tampering with the structure to be protected thereby, while at the same time certain parts of a seal once used, when detached from the structure, may be used repeatedly, thus securing economy in the maintenance of seals, such economical features of the invention being a considerable factor in the administration of an establishment or concern employing large quantities of seals.

In one aspect of the invention, the seal comprises three parts, two of which are capable of use again, said three parts being so combined and related to each other that the seal when applied to a meter, lamp, or other structure, cannot be removed without cutting or breaking the shackle or without so defacing or tampering with the seal body as to be at once detected.

Stated more specifically, the seal embodies two coöperating members, one of which is yieldable or elastic for interlocking frictional engagement with the other of said members, the shackle being combined with said two coöperating members so that said shackle is retained securely in position by them.

In the manufacture of my new seal, I employ materials appropriate for the purposes of the invention, but, from a commercial aspect, a preferred form of the seal embodies two simple metal punchings or stampings adapted to be assembled with each other in interlocking relation, said members coöperating with a shackle in such manner that the latter is retained or held effectively by the members. The form of the shackle may vary, for the reason that I may use a strand of fibrous material, such as a strong cord, or a metallic wire, strip, ribbon or band may be used.

Instead of making the two coöperating members of metal, one of said members may consist of fragile material, such as glass or porcelain, while the other member is of spring metal. Again, one member may be of cast metal or molded fictile material, while the other member is of spring metal adapted for interlocking engagement with the first member.

The seal of my invention is characterized by simplicity in construction, and economy in manufacture and in maintenance. It can be easily applied by hand, and in many cases, no tools whatever are required to apply the seal.

In the accompanying drawings I have illustrated different practical embodiments of the invention, but the constructions shown therein are to be understood as illustrative, only, and not as defining the limits of the invention.

Figure 1 is a plan view showing one form of seal embodying the invention. Fig. 2 is a cross section on the line 2—2 of Fig. 1. Fig. 3 is a detail view of one member of the seal body shown in Figs. 1 and 2 illustrating one method of fastening a shackle to said member. Fig. 4 is a plan view of another form of seal embodying the invention. Fig. 5 is a plan view of one member of the seal shown in Fig. 4 illustrating the method of applying a shackle thereto. Fig. 6 is a cross section on the line 6—6 of Fig. 5. Fig. 7 is a vertical section of another form of seal body with a sealing member connected thereto. Fig. 8 is a plan view of one member of the seal shown in Fig. 7. Fig. 9 is a cross section through one member of the seal body, said member being adapted for use in connection with seals such as are shown in Figs. 1 to 7, inclusive, and Figs. 10, 11 and 12 are, respectively, a vertical section on the line 10—10, a plan view, and a detail view of another form of seal embodying the invention.

The seal shown in Figs. 1, 2 and 3 comprises a shackle, A, and a seal body consisting of members, B, C.

Member, B, is shown as composed of sheet metal which is adapted to be stamped, punched or otherwise formed so as to be capable of a certain degree of elasticity or resiliency, whereby member, C, is adapted to be sprung into frictional and interlocking engagement with said member, B. Furthermore, member, B, is constructed to serve as a casing for member, C, and a part of shackle, A. To this end, member B, consists of a plate or disk, $b$, and an upstanding wall, $b'$, which is turned inwardly so as to produce a flange, $b^2$, an essential part of the member being a shoulder, $b^3$. Flange, $b^2$, is manipulated during the bending operation so as to produce the shoulder, $b^3$, and this flange is positioned internally with respect to annular wall, $b'$, said flange being shown as engaging with bottom plate or head, $b$.

As shown in Fig. 1, the inturned flange $b^2$ is slitted or cut at a number of points for the purpose of imparting to said flange a certain flexibility, in order that the flange may yield or give when a rigid insertible member is forced into the casing, the latter being formed by member B.

Member, C, is shown in the form of a disk, and it may consist of any suitable material, preferably material of a rigid nature. Said disk or member, C, may be cast in a single piece of metal, or it may consist of glass, porcelain, or other fictile material. As shown, member, C, is provided with a peripheral groove, $c$, and with a passage, groove or channel, $c'$, the latter opening through annular or peripheral groove, $c$. The construction of member, C, shown more clearly in Fig. 3, is intended to securely receive shackle, A, whereby said shackle may be united to member, C, prior to the assemblage of members, B, C, into interlocking engagement. Shackle, A, may consist of a wire or a cord which is doubled so as to form a loop, one end of said loop being passed through groove, $c'$, while the other end of the loop is passed around member, C, so as to occupy groove, $c$, said end of the cord or wire being then passed or threaded into groove, $c'$, whereby the two ends of the shackle are adapted to be twisted together if the shackle is composed of wire, or said ends may be tied together if the shackle consists of a cord. The united ends of the shackle lie within groove, $c'$, of member, C, and said member, with the shackle attached thereto, is adapted to be placed within member, B. Said member is provided with a groove, $d$, which is adapted to be occupied by a part of shackle, A, at the point where said shackle emerges from the seal.

After applying shackle, A, to member, C, the seal is completed by pressing member, C, into member, B. During the operation of forcing member, C, into position, shouldered part, $b^3$, and flange, $b^2$, of member, B, are adapted to yield or give sufficiently for said member, C, to pass shoulder, $b^3$. Member, C, is adapted to fill the space of member, B, within flange, $b^2$, thereof, whereby said member, C, engages with the bottom, $b$, and shoulder, $b^3$, of said member, B. The united part of shackle, A, lying within groove, $c'$, of member, C, is next to bottom plate, $b$, of member, B, and said shackle is thus held securely in position by member, C, which is incased within, and interlocked with, member, B.

From the foregoing description it is manifest that shackle, A, should be applied to a meter, lamp, or other apparatus which it is desired to protect against access, and then said shackle is united to member, C, which member is sprung into member, B. The shackle cannot be detached without cutting or breaking it from the apparatus. Should it be desired to remove the seal, member, C, when made of glass or porcelain, may be broken, after which the shackle may be disconnected by removing the fragments of member, C, from member, B. The shackle and member, B, can be used again by supplying a new member, C. In case members, B and C, are both made of metal, shackle, A, must be cut or broken in order to disconnect the seal, and member, C, can then be pried out of position within member, B, after which a new shackle can be used in conjunction with members, B and C.

By applying shackle, A, to member, C, so that the united ends of said shackle are positioned within groove, $c'$, it is impossible to disconnect the seal from the apparatus to be protected without cutting or breaking either the shackle, A, or member, C, in which case the seal will afford evidence of having been tampered with by unauthorized persons.

Figs. 4, 5 and 6 show another embodiment of the invention consisting of a two-part seal body and a shackle adapted to be united to one member of the seal body. In this construction the seal body consists of a flanged metallic member or casing, D, similar to the casing, B, of Fig. 2, except that casing, D, is provided with two notches, $d'$, $d^2$, preferably at diametrically opposite points in the shoulder, $b^2$, thereof. Member, E, is similar in some respects to member, C, except that said member, E, is provided with a transverse diametrical channel, $e$, which opens into an enlarged recess, $e'$, see Fig. 5. Shackle, A', is applied to the article and its ends are united to member, E, by forming a knot, $a$, said shackle passing through channel, e, in order that the knot, a, will occupy recess, e'. Member, E, with the shackle attached thereto, is forced into position within member, D, and the knotted part, a, of shackle, A', is confined within recess, e', and between member, E, and the bottom member or casing, D, the opposite portions of shackle, A', passing through notches, d', d², of member, D, as shown in Fig. 4.

The seals heretofore described embody an outer member or casing which is yieldable, and an inner member of rigid material adapted to be forced into said outer member, but the seal shown in Figs. 7 and 8 embodies a construction the reverse of those represented in Figs. 1 to 6 inclusive. The expansible or yieldable member in the seal of Figs. 7 and 8 is a flat disk, F, preferably of spring metal, whereas the outer member, G, is a casing of rigid material, whereby members, F, G, may be united by springing F into G. As shown, member, G, is a casing similar in many respects to casing, B, of Fig. 2 and D of Fig. 4, but it is preferred to make the inner flange, b², of member, G, with a groove, f, below shoulder, b³, said groove, f, forming another shoulder, f', by reason of the fact that the inner part of flange, b², is of less diameter than shoulder, b³. Member, F, is adapted to be bent or deflected in order to insert it into member, G, by passing member, F, while in a bowed or deflected condition within shoulder, b³, after which member, F, should be released so that it will spring into groove, f. Said member, F, is held between shoulders, b³, f', and thus has interlocking engagement with member or casing, G. Preferably expansible member, F, is provided with notch, g, through which is adapted to pass a shackle. It is to be understood that the shackle is first adjusted or applied to the structure to be sealed and its end portions are united or tied and deposited within casing or member, G, after which member, F, is sprung into position so as to interlock with casing, G, the shackle passing through notch, g.

The outer member or casing of the seal body heretofore described is provided with a flange extending inwardly thereof and to the bottom of casing, but in Fig. 9 I have illustrated another form of outer member or casing, H, wherein the depending inturned flange contacting with the bottom of said casing is modified. Said casing shown in Fig. 9 consists of a bottom plate or head, h, an upstanding rim or wall, h', and an inturned short lip, h², the latter having a notch, h³. Said lip corresponds to flange, b², and it is yieldable or expansible in order that the inner member may be sprung into position within said casing, H. It should be understood that casing, H, may be used in connection with an inner member of any suitable form and material, such as member, C, of Figs. 1 to 3 inclusive, or member, E, of Figs. 4 to 6 inclusive, although member, F, of Figs. 7 and 8 may be used with said casing, H. Furthermore, notch, h³, permits a shackle to pass through and into said casing or member, H.

In Figs. 10, 11 and 12 of the drawings there is represented a further embodiment of the invention consisting of members, I and J, adapted to form the seal body and coöperating with a shackle, A². Member, I, is a casing having an inturned flange at its open upper end, as at i, said flange forming a shoulder, i'. Casing, I, may be substantially rectangular in plan view and tapering in vertical section, see Figs. 10 and 11, or said casing may have any other desired shape, it being preferred to make the casing somewhat deeper than it is wide. Member, J, is represented as a plug composed, preferably, of glass, porcelain or other fictile material, although said plug may be of cast metal or any other appropriate material. As shown, member, J, is provided with annular grooves or depressions, j, and with an enlarged head, j'. Shackle, A², after having been applied to the structure to be sealed, has its end portions wrapped around member, J, so as to occupy grooves j, thereof, and the ends of said shackle are united by twisting or knotting them, as at a³, see Fig. 10. Member, J, with the shackle attached thereto, is now slipped into member, I, and the head, j', of said member, J, compressed against shoulder, i', until said head, j', snaps into locking engagement with flange, i, of member, I. Member, J, is thus interlocked with shouldered flange of member, I, and the seal thus has its parts united firmly together so that the united ends of the shackle are housed or contained within member or casing, I. The shoulder, i', of said casing, I, is provided with a notch, k, through which the shackle, A², passes, but, if desired, the headed portion, j', of member or plug, J, may have a notch, k', for the passage of the shackle, as shown in Fig. 12.

The operation and advantages of my invention will be readily understood from the foregoing description taken in connection with the drawings.

Having thus fully described the invention, what I claim as new, and desire to secure by Letters Patent is:

1. A snap seal comprising two parts separate from a shackle, one of said parts being a metal casing provided with a boundary wall the free edge of which is turned inwardly to form a shoulder positioned internally of the chamber within said casing member, the other part being insertible into the casing and having locking engagement with said shoulder thereof, one of said parts being yieldable to the other part during the operation of inserting said other part.

2. A seal comprising two members separate from a shackle, one of said members being a metal casing provided with an open side and with an inturned yieldable flange, and the other member consisting of rigid material and insertible into said casing through the space within the inturned flange thereof, said insertible member being locked in position by said inturned flange and said insertible member being provided with means for the attachment of a shackle.

3. A seal comprising two members separate from a shackle, one of said members being a substantially cup-shaped casing and the other member being insertible into and substantially incased by said cup-shaped member, said insertible member being provided with means for the attachment of a shackle thereto prior to inserting said member into the cup-shaped member, and said cup-shaped member being provided with a yielding part for retaining the insertible member.

4. A seal comprising two members separate from a shackle, one of said members being insertible into and substantially incased by the other member, said insertible member being provided with means for attaching a shackle thereto and said incasing member having means for locking the insertible member therein.

5. A seal comprising two members separate from a shackle, one of said members being a metal casing provided with an inturned yieldable flange, the latter producing a locking shoulder within the casing, and the other member being composed of a rigid disk which is insertible through the flange and into the casing to be substantially incased thereby, said rigid disk being in contact with the shoulder of said flange and retained thereby within the casing.

6. A seal comprising two parts, one of which is a metal casing provided with a yieldable flange internally thereof, and the other member being composed of rigid material, said second member being insertible into said casing by passing it into the space bounded by the yieldable flange.

7. A snap seal comprising two parts, one of which is a cup-shaped metal casing embodying rigid walls and having its boundary wall inturned to produce a flange, said flange being slitted internally of the boundary wall to render it yieldable, the other member being insertible into the casing by passing it into the space bounded by said yieldable flange, said second member being retained fixedly in position within the casing by frictional engagement of said yieldable flange with an edge portion of said second member.

8. In a seal, the combination of a plurality of coöperating members separate from a shackle, one of said members being a metal casing embodying rigid walls and having its boundary wall provided with a yieldable flange, the other member being composed of a substantially rigid disk adapted for its edge portion to engage directly with said flange during the operation of inserting said second member within said casing, said flange being yieldable to the pressure of the disk-like member during the operation of inserting the latter into said casing.

9. In a snap seal, the combination of a chambered metal member the boundary wall of which is inturned to produce a yieldable flange positioned interiorly of said member, a second member insertible into the chambered member and within the space bounded by said yieldable flange thereof, whereby said insertible member is precluded from displacement by engagement with said yieldable flange, and a shackle separate from both members, said shackle being attachable to the insertible member prior to the insertion of said second member into said chambered member.

10. In a seal, a chambered member provided with an inturned yieldable flange, said flange producing a shoulder within the chamber of said casing, a second member insertible into the casing, said second member being positioned for engagement with the shoulder of said flange, whereby the insertible member is held by the shoulder against withdrawal from the chambered member, and a shackle separate from both members and adapted to have its respective ends secured to the insertible member, whereby the shackle is attachable to the seal upon the insertion of the second member and is retained against displacement by the coöperation of the two members.

11. In a seal, a chambered member provided with an internal shoulder, a second member insertible into the chambered member, below the shoulder thereof, said insertible member being precluded from movement in the chambered member by the coöperation of the shoulder and the bottom of said chambered member, and a shackle held in the seal by the chambered member and the insertible member, one of said members being composed of yieldable material.

12. A snap seal composed of two parts, one of said parts being a metal casing and the other part being composed of fictile material and insertible into said casing, said insertible fictile part being locked directly to said metal casing.

13. A snap seal composed of two parts, one of said parts being a metal casing and the other part being composed of fictile material insertible into said casing, said metal casing being provided with means for receiving a shackle and said fictile part being locked directly to the casing independently of the shackle.

14. A snap seal composed of two parts, one of said parts being a metal casing provided with means for receiving a shackle and the other part being composed of fictile material insertible into said casing part, and means for locking the insertible fictile part to said metal casing part independently of the engagement of said fictile part with the shackle, said fictile part coöperating with the metal casing part in retaining the shackle relative to the metal casing part.

15. In a seal, a plurality of coöperating members separate from a seal-shackle, one of said members being a metallic casing, and the other member being composed of fictile material, said fictile member being insertible into said casing and partially exposed so that access may be had thereto, and means separate from a shackle for retaining the fictile member within said casing, whereby the fictile member may be broken for releasing a separate seal-shackle.

16. In a seal, a seal body comprising a casing having a yieldable flange positioned interiorly of the boundary wall thereof, and a member adapted to be substantially incased by said casing and interlocked with said yieldable flange, said incased member being composed of rigid fictile material.

17. In a seal, a seal body comprising a metallic casing having an internal locking shoulder, and another member provided with means for the attachment of a shackle, said second member being composed of frangible material and adapted for interlocking engagement with the shoulder of the casing, the shouldered part of said casing being adapted to yield upon the insertion of said second member.

In testimony whereof I have signed my name to this specification in the presence of two subscribing witnesses.

JOHN L. DINSMOOR.

Witnesses:
H. I. BERNHARD,
V. E. MARKMANN.